US012111600B2

(12) United States Patent
Shimada et al.

(10) Patent No.: US 12,111,600 B2
(45) Date of Patent: Oct. 8, 2024

(54) POWDER CONVEYING DEVICE AND IMAGE FORMING APPARATUS INCORPORATING SAME

(71) Applicants: Kazuhiro Shimada, Kanagawa (JP); Seiichi Kogure, Kanagawa (JP); Hideki Kimura, Kanagawa (JP); Hiroshi Kikuchi, Kanagawa (JP); Yusuke Ishizuka, Kanagawa (JP); Yutaka Takahashi, Kanagawa (JP); Takuya Akiyama, Kanagawa (JP); Yutaka Goto, Kanagawa (JP); Yuuki Aoki, Tokyo (JP)

(72) Inventors: Kazuhiro Shimada, Kanagawa (JP); Seiichi Kogure, Kanagawa (JP); Hideki Kimura, Kanagawa (JP); Hiroshi Kikuchi, Kanagawa (JP); Yusuke Ishizuka, Kanagawa (JP); Yutaka Takahashi, Kanagawa (JP); Takuya Akiyama, Kanagawa (JP); Yutaka Goto, Kanagawa (JP); Yuuki Aoki, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/200,584

(22) Filed: May 23, 2023

(65) Prior Publication Data

US 2023/0384730 A1 Nov. 30, 2023

(30) Foreign Application Priority Data

May 25, 2022 (JP) ................................ 2022-084982
Mar. 28, 2023 (JP) ................................ 2023-051459

(51) Int. Cl.
*G03G 21/10* (2006.01)
*G03G 15/08* (2006.01)
(Continued)

(52) U.S. Cl.
CPC ....... *G03G 21/105* (2013.01); *G03G 15/0844* (2013.01); *G03G 15/0858* (2013.01);
(Continued)

(58) Field of Classification Search
CPC ........... G03G 15/0844; G03G 15/0858; G03G 15/0877; G03G 15/0886; G03G 15/0891;
(Continued)

(56) References Cited

U.S. PATENT DOCUMENTS

2010/0003055 A1 1/2010 Kikuchi et al.
2010/0129118 A1 5/2010 Kimura et al.
(Continued)

FOREIGN PATENT DOCUMENTS

JP 7-092875 4/1995
JP 2020-201476 12/2020

*Primary Examiner* — Joseph S Wong
(74) *Attorney, Agent, or Firm* — XSENSUS LLP

(57) ABSTRACT

A powder conveying device includes a drop conveyance passage, an intersecting conveyance passage, a conveying screw, and a floating member. Powder entering from an inflow port drops in the drop conveyance passage. The intersecting conveyance passage communicates with a lower end of the drop conveyance passage and extends in an intersecting direction that intersects the drop conveyance passage. The conveying screw is disposed in the intersecting conveyance passage and rotates in a specified direction to convey the powder in the intersecting direction. The floating member is movably installed in the drop conveyance passage and floats in the drop conveyance passage to move by contact with the conveying screw. The inflow port and the floating member interfere with each other to prevent the floating member from coming out of the inflow port of the drop conveyance passage.

20 Claims, 7 Drawing Sheets

(51) Int. Cl.
*G03G 21/12* (2006.01)
*G03G 21/16* (2006.01)

(52) U.S. Cl.
CPC ..... *G03G 15/0877* (2013.01); *G03G 15/0886* (2013.01); *G03G 15/0891* (2013.01); *G03G 15/0896* (2013.01); *G03G 21/10* (2013.01); *G03G 21/12* (2013.01); *G03G 21/1647* (2013.01); *G03G 2215/0802* (2013.01); *G03G 2221/0005* (2013.01)

(58) Field of Classification Search
CPC .. G03G 15/0896; G03G 21/10; G03G 21/105; G03G 21/12; G03G 21/1647; G03G 2215/0802; G03G 2221/0005
See application file for complete search history.

(56) References Cited

U.S. PATENT DOCUMENTS

| | | | | |
|---|---|---|---|---|
| 2014/0314461 | A1 | 10/2014 | Ishizuka et al. | |
| 2015/0078795 | A1 | 3/2015 | Kuwabara et al. | |
| 2015/0346638 | A1* | 12/2015 | Mizusawa .......... | G03G 15/0891 399/358 |
| 2017/0261887 | A1 | 9/2017 | Ishizuka et al. | |
| 2019/0018343 | A1* | 1/2019 | Oshikawa .......... | G03G 15/0865 |
| 2020/0387085 | A1 | 12/2020 | Ishizuka et al. | |

* cited by examiner

POWDER CONVEYING DEVICE AND IMAGE FORMING APPARATUS INCORPORATING SAME

CROSS-REFERENCE TO RELATED APPLICATIONS

This patent application is based on and claims priority pursuant to 35 U.S.C. § 119(a) to Japanese Patent Application Nos. 2022-084982, filed on May 25, 2022, and 2023-051459, filed on Mar. 28, 2023, in the Japan Patent Office, the entire disclosure of which is hereby incorporated by reference herein.

BACKGROUND

Technical Field

Embodiments of the present disclosure relate to a powder conveying device to convey powder such as waste toner, and an image forming apparatus, such as a copier, a printer, a facsimile machine, or a multifunction peripheral (MFP) having at least two of such capabilities, incorporating the powder conveying device.

Related Art

Image forming apparatuses, such as copiers or printers, are known that include a drop conveyance passage and an intersecting conveyance passage as conveyance passages for conveying powder such as waste toner. Powder having flowed in from an inlet port drops by its own weight through the drop conveyance passage. A conveying screw is driven to rotate to convey the powder, which has flowed in from the drop conveyance passage, in an intersecting direction through the intersecting conveyance passage.

SUMMARY

In an embodiment of the present disclosure, there is provided a powder conveying device that includes a drop conveyance passage, an intersecting conveyance passage, a conveying screw, and a floating member. Powder entering from an inflow port drops in the drop conveyance passage. The intersecting conveyance passage communicates with a lower end of the drop conveyance passage and extends in an intersecting direction that intersects the drop conveyance passage. The conveying screw is disposed in the intersecting conveyance passage and rotates in a specified direction to convey the powder in the intersecting direction. The floating member is movably installed in the drop conveyance passage and floats in the drop conveyance passage to move by contact with the conveying screw. The inflow port and the floating member interfere with each other to prevent the floating member from coming out of the inflow port of the drop conveyance passage.

In another embodiment of the present disclosure, there is provided an image forming apparatus that includes the powder conveying device.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
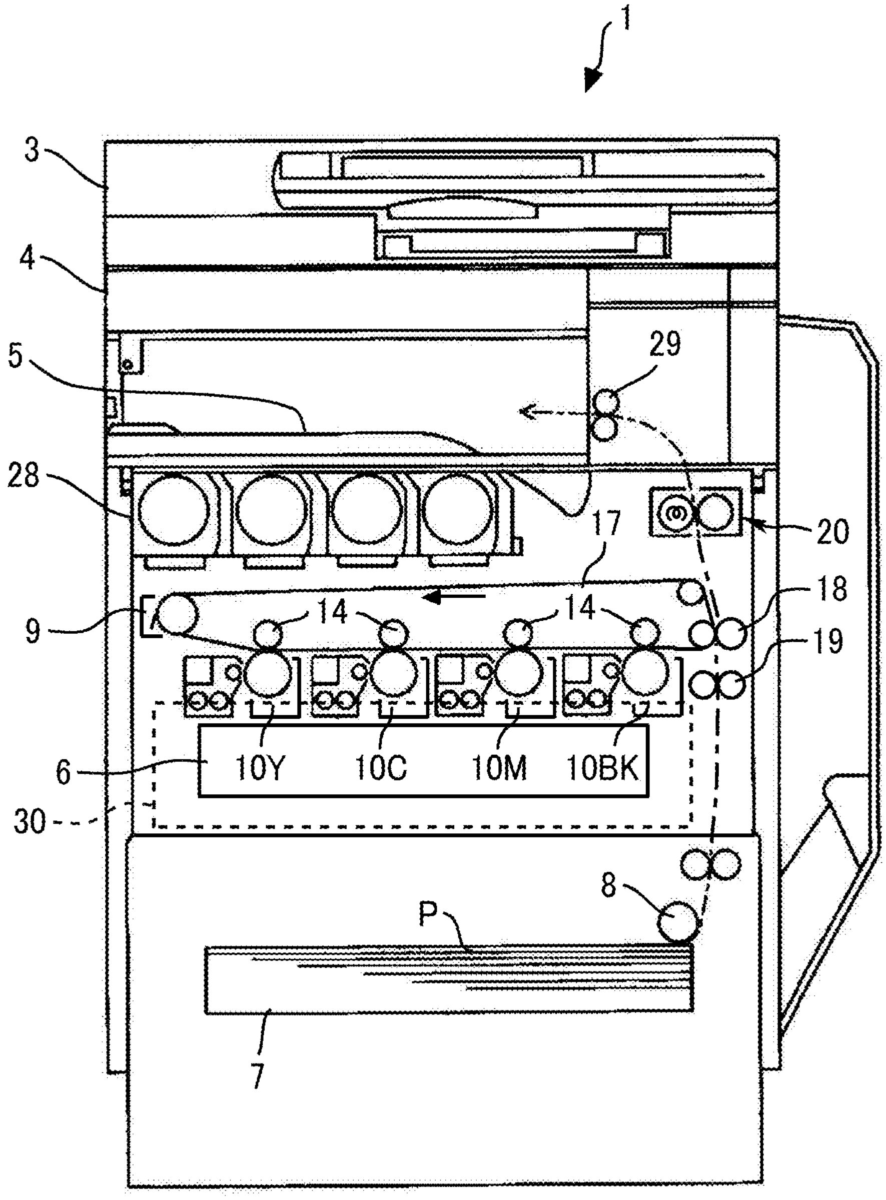
FIG. 1 is a diagram illustrating an overall configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

With reference to the drawings, embodiments of the present disclosure are described in detail below. Identical reference numerals are assigned to identical components or equivalents and descriptions of those components may be simplified or omitted.

First, with reference to FIG. 1, a description is given of an overall configuration and operation of an image forming apparatus 1 according to an embodiment of the present disclosure. In FIG. 1, the image forming apparatus 1, which is illustrated as a color copier in the present embodiment, includes a document conveying device 3, a scanner 4 (document reading device), and a writing device 6 (exposure device). The document conveying device 3 conveys documents to the scanner 4. The scanner 4 scans the documents to read image data. The writing device 6 emits a laser beam based on input image data. The image forming apparatus 1 also includes a sheet feeder 7, process cartridges 10Y, 10M, 10C, and 10BK, an intermediate transfer belt 17 (an image bearer), and a secondary transfer roller 18. The sheet feeder 7 stores sheets P such as sheets of paper. The process cartridges 10Y, 10M, and 10BK are image forming devices to form toner images of yellow, magenta, cyan, and black, respectively. The toner images of multiple colors are transferred and superimposed one on another onto the intermediate transfer belt 17. The secondary transfer roller 18 transfers the toner images on the intermediate transfer belt 17 onto the sheet P. The image forming apparatus 1 further includes a fixing device 20, toner containers 28, and a waste-toner collection container 30. The fixing device 20 fixes unfixed toner images on the sheet P. The toner containers 28 contain toners of respective colors to be supplied to developing devices 13 of the corresponding process cartridges 10Y, 10M, 10C, and 10BK. Waste-toner is collected in the waste-toner collection container 30.

Figure 2:
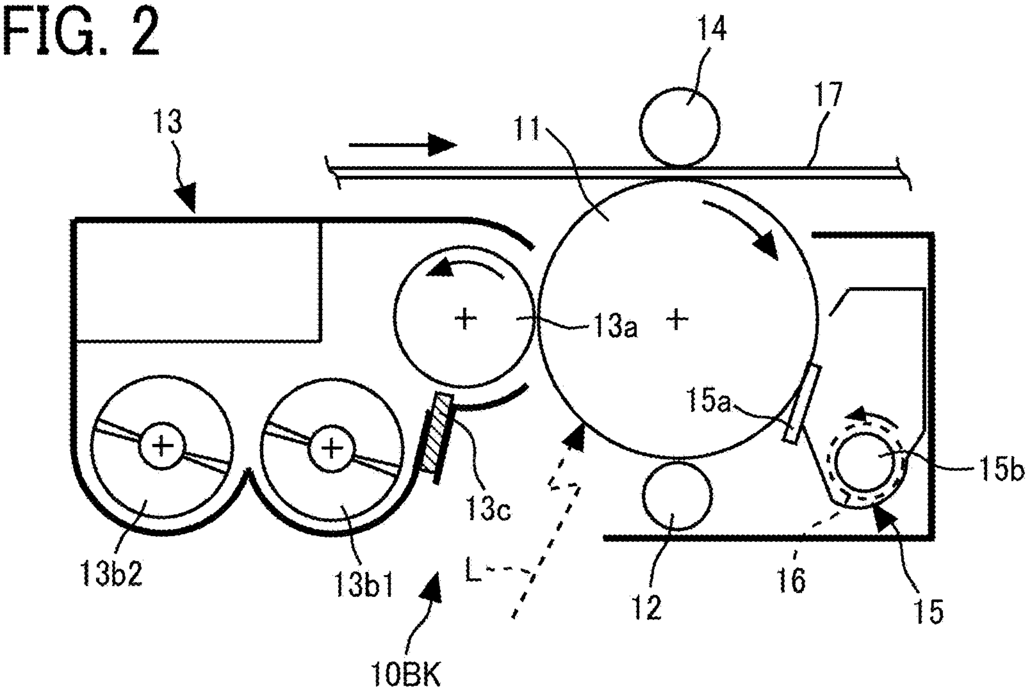
FIG. 2 is a schematic view of an image forming device of the image forming apparatus in FIG. 1.

Each of the process cartridges 10Y, 10M, 10C, and 10BK (serving as image forming devices) includes a photoconductor drum 11 (serving as an image bearer), a charging device 12, the developing device 13, and a cleaning device 15, which are integrated as a single unit as illustrated in FIG. 2. Each of the process cartridges 10Y, 10M, 10C, and 10BK, which is expendable, is replaced with a new one when depleted. Yellow, magenta, cyan, and black toner images are formed on the respective photoconductor drums 11 (serving as image bearers) in the process cartridges 10Y, 10M, 10C, and 10BK.

A description is given below of operations of the image forming apparatus 1 to form a normal color toner image. A conveyance roller of the document conveying device 3 conveys a document on a document table onto an exposure glass of the scanner 4. The scanner 4 optically scans the document on the exposure glass to read image data. The yellow, magenta, cyan, and black image data are transmitted to the writing device 6. The writing device 6 irradiates the photoconductor drums 11 of the corresponding process cartridges 10Y, 10M, 10C, and 10BK with laser beams L (exposure light) based on the yellow, magenta, cyan, and black image data, respectively.

Meanwhile, the four photoconductor drums 11 rotate clockwise as illustrated in FIGS. 1 and 2. With reference to FIG. 2, the charging device 12 (charging roller) uniformly charges a surface of the photoconductor drum 11 at a position opposite the photoconductor drum 11 (charging process). Thus, the surface of the photoconductor drum 11 is charged to a certain potential. Subsequently, the surface of the photoconductor drum 11 thus charged reaches a position where the surface of the photoconductor drum 11 is irradiated with the laser beam L. The writing device 6 emits the laser beams L for respective colors from a light source according to the image data. The laser beams L are reflected by a polygon mirror and transmitted through multiple lenses. The laser beams L transmitted through the multiple lenses passes through different optical paths for the different color components of yellow, magenta, cyan, and black (exposure process).

The laser beam L corresponding to the yellow image data is emitted to the surface of the photoconductor drum 11 in the process cartridge 10Y, which is the first from the left in FIG. 1 among the four process cartridges 10Y, 10M, 10C, and 10BK. Thus, an electrostatic latent image for yellow is formed on the photoconductor drum 11 charged by the charging device 12 (charging roller). Similarly, the laser beam L corresponding to the cyan image data is emitted to the surface of the photoconductor drum 11 in the second process cartridge from the left in FIG. 1, thus forming an electrostatic latent image corresponding to the cyan image data on the surface of the photoconductor drum 11. The laser beam L corresponding to the magenta image data is emitted to the surface of the photoconductor drum 11 in the third process cartridge 10M from the left in FIG. 1, thus forming an electrostatic latent image corresponding to the magenta image data on the surface of the photoconductor drum 11. The laser beam L corresponding to black image data is emitted to the surface of the photoconductor drum 11 in the fourth process cartridge 10BK from the left in FIG. 1, thus forming an electrostatic latent image corresponding to the black image data on the surface of the photoconductor drum 11.

Then, the surface of the photoconductor drum 11 having the electrostatic latent image reaches a position opposite the developing device 13 (see FIG. 2). The developing device 13 supplies toner of each color onto the surface of the photoconductor drum 11 and develops the electrostatic latent image on the photoconductor drum 11 into a toner image (development process). Subsequently, the surface of the photoconductor drum 11 after the development process reaches a position opposite the intermediate transfer belt 17 (intermediate transferor) as image bearer. Each of primary transfer rollers 14 is disposed at the position where the surface of the photoconductor drum 11 faces the intermediate transfer belt 17 such that the primary transfer roller 14 contacts an inner circumferential surface of the intermediate transfer belt 17. At the positions of the primary transfer rollers 14, the toner images on the photoconductor drums 11 are sequentially transferred to and superimposed on the intermediate transfer belt 17, forming a multicolor toner image thereon (primary transfer process).

After the primary transfer process, the surface of the photoconductor drum 11 reaches a position opposite the cleaning device 15 (see FIG. 2). The cleaning device 15 collects untransferred toner remaining on the photoconductor drum 11 (cleaning process). Then, the surface of the photoconductor drum 11 passes through a discharging device to complete a series of image forming processes performed on the photoconductor drum 11.

Meanwhile, the surface of the intermediate transfer belt 17, onto which the single-color toner images on the photoconductor drums 11 are transferred and superimposed, moves in a direction indicated by an arrow in FIG. 1 and reaches a position opposite a secondary transfer roller 18. The secondary transfer roller 18 secondarily transfers the multicolor toner image on the intermediate transfer belt 17 onto the sheet P (secondary transfer process). After the secondary transfer process, the surface of the intermediate transfer belt 17 reaches a position opposite an intermediate transfer belt cleaner 9 (cleaning device). The intermediate transfer belt cleaner 9 collects the untransferred toner on the intermediate transfer belt 17 to complete a series of transfer processes on the intermediate transfer belt 17.

The sheet P is conveyed from the sheet feeder 7 to the position of the secondary transfer roller 18, via a sheet conveyance guide, a registration roller pair 19, or the like. More specifically, a feed roller 8 feeds the sheet P from the sheet feeder 7 that stores a stack of sheets P, and the sheet P is then guided by the sheet conveyance guide to the registration roller pair 19. The sheet P that has reached the registration roller pair 19 is conveyed toward the position of the secondary transfer roller 18 so that the sheet P coincides with the arrival of the multicolor toner image on the intermediate transfer belt 17.

Subsequently, the sheet P, onto which the multicolor image is transferred, is conveyed to the fixing device 20. The fixing device 20 includes a fixing roller and a pressure roller pressing against each other. In a nip between the fixing roller and the pressure roller, the multicolor toner image is fixed on the sheet P. After the fixing process, an output roller pair 29 ejects the sheet P as an output image to the exterior of a body of the image forming apparatus 1, and the ejected sheets P are stacked on an output tray 5 to complete a series of image forming processes.

Next, with reference to FIG. 2, image forming devices of the image forming apparatus 1, according to an embodiment of the present disclosure, are described in detail below. FIG. 2 is a schematic view of the process cartridge 10BK for black. The other three process cartridges 10Y, 10M, and 10C have a similar configuration as the process cartridge for black except for the color of toner used in the image forming process, and thus drawings and descriptions thereof are omitted to avoid redundancy.

As illustrated in FIG. 2, the process cartridge 10BK is a single unit that includes the photoconductor drum 11 as the image bearer, the charging device 12 to charge the photoconductor drum 11, the developing device 13 to develop the electrostatic latent image on the photoconductor drum 11, and the cleaning device 15 to remove the untransferred toner from the photoconductor drum 11 in a casing of the process cartridge 10BK.

The photoconductor drum 11 is an organic photoconductor designed to be charged with a negative polarity and includes a photosensitive layer formed on a drum-shaped conductive support. The charging device 12 is a charging roller including a conductive core and an elastic layer of moderate resistivity overlaid on the conductive core. A power supply applies a specified voltage to the charging device 12 (charging roller). Thus, the charging device 12 uniformly charges the surface of the photoconductor drum 11 facing the charging device 12.

The developing device 13 includes a developing roller 13*a* disposed opposite the photoconductor drum 11, a first conveying screw 13*b*1 disposed opposite the developing roller 13*a*, a second conveying screw 13*b*2 disposed opposite the first conveying screw 13*b*1 via a partition, and a doctor blade 13*c* disposed opposite the developing roller 13*a*. The developing roller 13*a* includes multiple magnets and a sleeve that rotates around the magnets. The magnets are stationary and generate magnetic poles around the circumferential surface of the developing roller 13*a*. The magnets generate a plurality of magnetic poles on the developing roller 13*a* (sleeve) to bear developer on the developing roller 13*a*. The developing device 13 stores two-component developer including carrier and toner.

The cleaning device 15 is provided with a cleaning blade 15*a* that contacts the photoconductor drum 11 and a conveying screw 15*b* (a conveyance tube 16) that conveys the untransferred toner collected in the cleaning device 15 toward the waste-toner collection container 30 (see FIG. 3) as waste toner. For example, the cleaning blade 15*a* is made of rubber, such as urethane rubber, and contacts the surface of the photoconductor drum 11 at a specified angle with a specified pressure. With this configuration, substances such as the untransferred toner adhering to the photoconductor drum 11 are mechanically scraped off and collected in the cleaning device 15. The untransferred toner collected in the cleaning device 15 is conveyed to the waste-toner collection container 30 via the conveyance tube 16 (in which the conveying screw 15*b* is disposed) by a waste-toner conveying device 40 as the powder conveying device (see FIG. 3). The conveyed untransferred toner is collected in the waste-toner collection container 30 as the waste toner (powder). The conveying screw 15*b* is driven by a drive motor via a gear 50 (see FIG. 3) to rotate in a direction indicated by an arrow in FIGS. 2 and 3. Similarly, with reference to FIG. 1, the intermediate transfer belt cleaner 9 as a cleaning device is also provided with a cleaning blade and a conveying screw. The cleaning blade contacts the intermediate transfer belt 17. The conveying screw (conveyance tube 16) conveys the untransferred toner collected in the intermediate transfer belt cleaner 9 toward the waste-toner collection container 30 (see FIG. 3) as waste toner. The untransferred toner collected in the intermediate transfer belt cleaner 9 is conveyed to the waste-toner collection container 30 via the conveyance tube 16 (in which a conveying screw is disposed) by the waste-toner conveying device 40 and is collected in the waste-toner collection container 30 as waste toner (powder). A description is given of the waste-toner conveying device 40 in further detail below. In addition to the untransferred toner, substances adhering to the photoconductor drum 11 or the intermediate transfer belt 17 include paper dust resulting from the sheet P, discharge products generated on the photoconductor drum 11 during discharge by the charging device 12, additives to the toner, and the like. In the present specification, such substances are collectively referred to as the "untransferred toner".

The image forming processes, described above, are described in further detail below with reference to FIG. 2. The developing roller 13*a* rotates in a direction (counterclockwise) indicated by an arrow in FIG. 2. In the developing device 13, as the first conveying screw 13*b*1 and the second conveying screw 13*b*2 arranged via the partition rotate, the developer is circulated in the longitudinal direction of the developing device 13, while being stirred and mixed with toner supplied from the toner container 28 by a toner supply device. The longitudinal direction of the developing device 13 is perpendicular to the plane on which FIG. 2 is illustrated.

Thus, the toner is triboelectrically charged and attracted to the carrier. The toner is borne on the developing roller 13*a* together with the carrier. The developer borne on the developing roller 13*a* reaches a position opposite the doctor blade 13*c*. After having been adjusted to an appropriate amount at the position of the doctor blade 13*c*, the developer on the developing roller 13*a* then comes to an opposing position to the photoconductor drum 11 (i.e., a development area). In the development area, the toner in the developer adheres to the electrostatic latent image formed on the surface of the photoconductor drum 11. The toner adheres to the electrostatic latent image (i.e., the toner image is formed) by a development electric field formed by a potential difference (i.e., a developing potential) between a latent image potential (i.e., an exposure potential) of an image area irradiated with the laser beam L and a developing bias applied to the developing roller 13*a*. Subsequently, most of the toner attached to the photoconductor drum 11 in the developing process is transferred onto the intermediate transfer belt 17. The untransferred toner remained on the surface of the photoconductor drum 11 is collected in the cleaning device 15 by the cleaning blade 15*a*.

Figure 3:
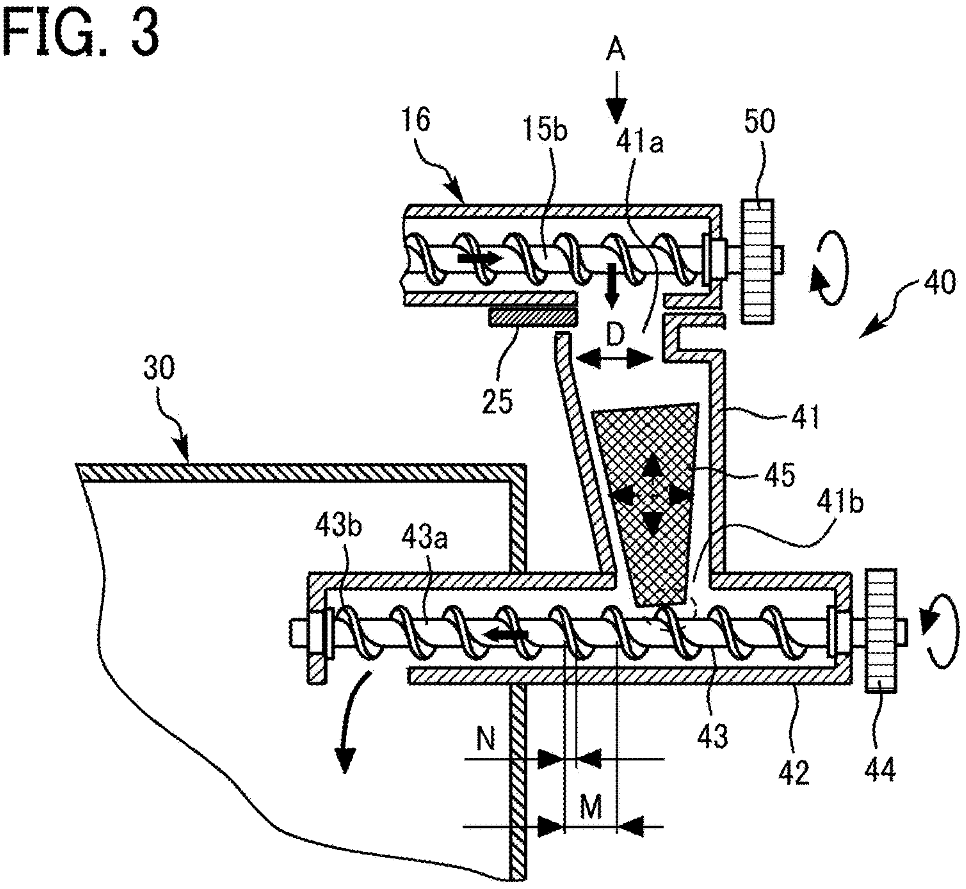
FIG. 3 is a cross-sectional view of a part of a waste-toner conveying device, according to an embodiment of the present disclosure.

A description is given of the waste-toner conveying device 40 as a powder conveying device disposed in the image forming apparatus 1 according to the present embodiment. With reference to FIG. 3, the waste-toner conveying device 40 as a powder conveying device conveys waste toner, which is powder collected by the cleaning device 15 and the intermediate transfer belt cleaner 9 and conveyed via the conveyance tube 16, toward the waste-toner collection container 30 in a direction indicated by a black arrow in FIG. 3. The waste-toner collection container 30 is detachably (replaceably) attached in the body of the image forming apparatus 1. When the waste-toner collection container 30 is attached to the body of the image forming apparatus 1, the waste-toner collection container 30 is communicatively coupled with the waste-toner conveying device 40 (an intersecting conveyance passage 42). The waste toner that has conveyed by the waste-toner conveying device 40 is collected in the waste-toner collection container 30.

As illustrated in FIG. 3, the waste-toner conveying device 40 (powder conveying device) includes, for example, a drop conveyance passage 41, the intersecting conveyance passage 42, a conveying screw 43, and a floating member 45. The drop conveyance passage 41 is a conveyance passage along which toner (waste toner) as powder that has flowed into from an inflow port 41*a* drops by its weight, and is formed to extend in a substantially vertical direction in the present embodiment. The drop conveyance passage 41 according to the present embodiment is substantially circular in cross section (which is a horizontal cross section). The inflow port 41*a* of the drop conveyance passage 41 is connected to a discharge port formed downstream from the conveyance tube 16. The intersecting conveyance passage 42 is a conveyance passage that extends in an intersecting direction that intersects the drop conveyance passage 41. An upper portion of the intersecting conveyance passage 42 communicates with a lower end (an outflow port 41*b*) of the drop conveyance passage 41. In the present embodiment, the intersecting conveyance passage 42 extends straight in a substantially horizontal direction and is a circular shape in cross section slightly larger than a screw diameter of the conveying screw 43 to be described below. The conveying screw 43 is disposed in the intersecting conveyance passage 42 and rotates in a specified direction (a direction indicated by an arrow in FIG. 3) to convey toner in the intersecting direction. The conveying screw 43 includes a shaft portion 43*a* and a screw portion 43*b* wound around the shaft portion 43*a*. The conveying screw 43 is driven by a drive motor via a gear 44 and rotates in the direction indicated by an arrow in FIG. 3. Both ends of the conveying screw 43 in an axial direction of the conveying screw 43 are rotatably supported by a housing of the waste-toner conveying device 40. In the present embodiment, both of the shaft portion 43*a* and the screw portion 43*b* of the conveying screw 43 are made of a metal material such as stainless steel having high mechanical strength.

In the present embodiment, the drop conveyance passage 41 extends in the substantially vertical direction. Alternatively, a drop conveyance passage can be used that has any shape allowing waste toner to fall by its own weight. For example, a drop conveyance passage can be used that allows toner to slide down on an inclined surface inclined relative to the vertical direction to fall by its own weight. Further, in the present embodiment, the intersecting conveyance passage 42 extends in the substantially horizontal direction. The intersecting conveyance passage 42 with any shape in which waste toner is conveyed in the intersecting direction by the conveying screw 43 can be used. Thus, for example, a shape with an inclined surface inclined relative to the horizontal direction, or with a partly or entirely curved portion, is also feasible.

In the waste-toner conveying device 40 according to the present embodiment, the floating member 45 is movably disposed in the drop conveyance passage 41. The floating member 45 floats in the drop conveyance passage 41 and randomly contacts an inner wall of the drop conveyance passage 41 due to contact with the conveying screw 43 rotating in a specified direction (the direction indicated by an arrow in FIG. 3) while maintaining a vertical posture to some extent without changing a vertical relationship such as falling in a horizontal direction. Specifically, the floating member 45 is a column-shaped member extending in substantially the same direction as a direction in which the drop conveyance passage 41 extends (in a vertical direction), and is placed on the conveying screw 43 in a free state in the drop conveyance passage 41 without being supported by any member. A cross-sectional diameter R1 (see FIG. 4) of a lower end of the floating member 45 is set to be larger than a clearance between the conveying screw 43 and the intersecting conveyance passage 42 so that the floating member 45 floats above the rotating conveying screw 43 without entering the clearance between the conveying screw 43 and the intersecting conveyance passage 42.

The floating member 45 moves to the left in FIG. 3 along with the rotation of the conveying screw 43 to contact the left inner wall of the drop conveyance passage 41 or contacts an inner wall other than the left inner wall due to reaction or imbalance of an upper part of the floating member 45. Thus, the floating member 45 randomly swings in a free posture and in a free direction to almost uniformly contact the inner wall of the drop conveyance passage 41. As a result, the floating member 45 contacts the inner wall of the drop conveyance passage 41 over substantially the entire circumferential surface with a relatively wide range (as an operating range) extending upward from the lower end of the drop conveyance passage 41 (which is a communicating portion with the intersecting conveyance passage 42). Thus, a failure that waste toner adheres to the inner wall of the drop conveyance passage 41 can be reduced. Even if waste toner adheres to the inner wall of the drop conveyance passage 41, the contact of the floating member 45 can remove the adhered toner. Accordingly, a failure that the drop conveyance passage 41 is blocked by the adhered toner is also reduced. In particular, toner adhesion to the inner wall of the drop conveyance passage 41 is not likely to occur on the upper end of the drop conveyance passage 41 and is likely to occur in a range from the lower end to the central portion. Thus, it is useful to set the length H (see FIG. 4) of the floating member 45 such that the floating member 45 can contact the inner wall of the drop conveyance passage 41 in such a range. Since the waste toner is likely to adhere to the inner wall of the drop conveyance passage 41 as compared to new toner (fresh toner), it is useful to install the floating member 45 in the drop conveyance passage 41 for waste toner.

In the present embodiment, the floating member 45 has a hardness smaller than the hardness of the conveying screw 43. Specifically, in the present embodiment, the floating member 45 is made of a material such as a rubber material or a resin material and has a hardness smaller than the hardness of the conveying screw 43 made of a metal material. Thus, the hardness of the floating member 45 is smaller than the hardness of the conveying screw 43, so that a failure can be reduced that the conveying screw 43 is worn out due to repeated contact with the floating member 45.

Accordingly, the good performance of conveying toner by the conveying screw 43 is maintained over time. Note that the hardness of the floating member 45 may be smaller than the hardness of the conveying screw 43 as a whole or only at the surface of the floating member 45. That is, the hardness of at least the surface (outer surface) of the floating member 45 may be smaller than the hardness of the conveying screw 43.

Although the floating member 45 wears due to repeated contact with the conveying screw 43, the worn portion is limited to a bottom portion that contacts the conveying screw 43, and a portion contacting the inner wall of the drop conveyance passage 41 hardly wears. The length H (see FIG. 4) of the contacting portion is set to be sufficiently long, so that the function of preventing toner adhesion to the inner wall of the drop conveyance passage 41 is stably maintained over time. Even if the bottom of the floating member 45 wears, using the column-shaped floating member 45 can prevent the floating member 45 from being caught in the screw portion 43*b* of the conveying screw 43 and causing a failure such as malfunction or breakage of the conveying screw 43 as compared with a case of using a spherical member.

In the present embodiment, the hardness of the floating member 45 is smaller than the hardness of the inner wall of the drop conveyance passage 41 (which is formed of a resin material having a relatively high strength). Accordingly, a failure that the drop conveyance passage 41 wears due to repeated contact with the floating member 45 can be reduced. Note that the hardness of the floating member 45 may be smaller than the hardness of the inner wall of the drop conveyance passage 41 as a whole or only at the surface of the floating member 45. In other words, the hardness of at least the surface (outer surface) of the floating member 45 may be smaller than the hardness of the inner wall of the drop conveyance passage 41.

In the present embodiment, the floating member 45 is preferably elastic and made of an elastic material such as rubber. Accordingly, the hardness of the floating member 45 can be significantly lower than the hardness of the conveying screw 43 made of a metal material, so that the effect of reducing wear of the conveying screw 43 is more likely to be achieved. Since the floating member 45 is an elastic member, a reaction force generated when the floating member 45 contacts the conveying screw 43 or the inner wall of the drop conveyance passage 41 increases by an elastic force. As a result, the floating member 45 greatly moves, and, the effect of preventing the toner from adhering to the inner wall is easily achieved.

Figure 4:
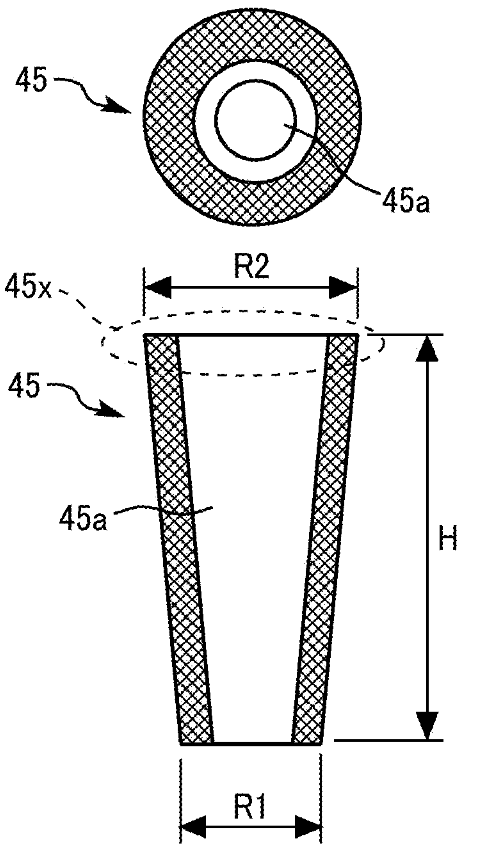
FIG. 4 includes a top view and a cross-sectional side view of a floating member of the waste-toner conveying device in FIG. 3.

As illustrated in FIGS. 3 and 4, in the present embodiment, the floating member 45 is formed in a substantially conical shape (columnar shape) to have a circular cross section. In a case where the floating member 45 is formed to have a polygonal cross section, the corners of the floating member 45 contact the inner wall of the drop conveyance passage 41 and wear out. Consequently, the condition of contact with the inner wall changes over time. As a result, the effect of preventing toner from adhering to the inner wall of the drop conveyance passage 41 may change over time. On the other hand, the floating member 45 having a columnar cross section can reduce such a failure.

As illustrated in FIG. 4, the floating member 45 according to the present embodiment has a through-hole 45*a* formed therein. The floating member 45 has the through-hole 45*a* in this manner to reduce the weight of the floating member 45. The wear of the conveying screw 43 and the inner wall of the drop conveyance passage 41 due to contact of the floating member 45 can be further reduced. Since the weight reduction of the floating member 45 increases reaction when the floating member 45 contacts the conveying screw 43 or the inner wall of the drop conveyance passage 41, the floating member 45 greatly moves. Thus, the effect of preventing toner from adhering to the inner wall is easily achieved. The through-hole 45*a* of the floating member 45 causes a part of the waste toner that falls by its weight in the drop conveyance passage 41 to fall by its weight via the through-hole 45*a*. Thus, the fluidity (transportability) of the waste toner in the drop conveyance passage 41 can be enhanced as compared with a case where the floating member 45 has no through-hole 45*a*.

With reference to FIGS. 3 and 4, in the present embodiment, a relationship of $R1>M-N$ is established, where R1 represents a diameter (a cross-sectional diameter) of an inscribed circle of a bottom surface (a lower end) of the floating member 45, M represents a screw pitch of the conveying screw 43, and N represents a plate thickness of the screw portion 43*b* of the conveying screw 43. In a case where the above-described relationship is not established, the floating member 45 may fit in or enter between the screw portions 43*b* of the conveying screw 43. Thus, a failure may occur that the movement of the floating member 45 due to contact with the rotating conveying screw 43 is restricted or that the floating member 45 is broken. On the other hand, in the present embodiment, the dimensions of the related components are defined such that the floating member 45 does not fit in or enter between the screw sections 43*b* of the conveying screw 43. Thus, the occurrence of such a failure can be reduced.

With reference to FIGS. 3 and 4, in the present embodiment, a relationship of $H>Dmax$ is established, where H represents the length of the floating member 45, and Dmax represents the cross-sectional diameter (of the largest portion) of the inside of the drop conveyance passage 41. In a case where the above-described relationship is not established, a failure may occur that the floating member 45 falls to be greatly inclined with respect to the vertical direction and is fitted onto the inner wall of the drop conveyance passage 41. In such a case, the floating member 45 does not move, and the function of preventing toner adhesion is not achieved. On the other hand, in the present embodiment, since the length H of the floating member 45 is set to be sufficiently larger than the cross-sectional diameter Dmax of the drop conveyance passage 41, the occurrence of such a failure can be reduced. Note that, in the present embodiment, the internal cross section of the drop conveyance passage 41 is circular. In a case where the internal cross section of the drop conveyance passage 41 is rectangular, the length of the diagonal line of the cross section is defined as the cross-sectional diameter D.

In the present embodiment, the specific gravity of the floating member 45 is greater than the specific gravity of waste toner (powder). Accordingly, a failure is reduced that a large amount of waste toner is interposed between the conveying screw 43 and the floating member 45 to greatly float up the floating member 45 above the conveying screw 43. In other words, even in a case where a large amount of waste toner is in the intersecting conveyance passage 42, the floating member 45 contacts the conveying screw 43 in a manner such that the floating member 45 intrudes into the waste toner due to a difference in the specific gravity between the floating member 45 and the waste toner. As a result, the floating member 45 contacts and moves relative to the conveying screw 43, the effect of reducing toner adhesion to the inner wall of the drop conveyance passage 41 is maintained.

With reference to FIG. 3, the waste-toner conveying device 40 according to the present embodiment is detachably attached to the conveyance tube 16 in a state of being installed in the body of the image forming apparatus 1. The conveyance tube 16 is detachably attached to the waste-toner conveying device 40 in a state of being installed in the body of the image forming apparatus 1. The waste-toner conveying device 40 is formed such that a cleaning device 90 (see FIG. 6) is detachably attached to the inflow port 41*a* of the drop conveyance passage 41. With such a configuration, for the waste-toner conveying device 40 removed from the image forming apparatus 1 or the waste-toner conveying device 40 from which the conveyance tube 16 has been removed in the image forming apparatus 1, a suction port of the cleaning device 90 is connected to the inflow port 41*a* of the drop conveyance passage 41, so that the waste-toner conveying device 40 can be cleaned. Specifically, the cleaning device 90 is operated in a state where the cleaning device 90 is set at the inflow port 41*a*. Thus, the waste toner remaining in the waste-toner conveying device 40 is sucked (removed) by the cleaning device 90. Note that, as illustrated in FIG. 3, the conveyance tube 16 is provided with a shutter 25 that opens and closes the discharge port (which is an opening communicating with the inflow port 41*a*) in conjunction with the relative attaching and detaching operations of the waste-toner conveying device 40 to and from the conveyance tube 16. As a result, even when the waste-toner conveying device 40 is removed, a failure that waste toner leaks from the discharge port of the conveyance tube 16 is reduced.

A description is given of the waste-toner conveying device 40 as the powder conveying device according to the present embodiment in detail below. With reference to FIGS. 3 to 6, the waste-toner conveying device 40 according to the present embodiment is formed such that the inflow port 41*a* of the drop conveyance passage 41 and the floating member 45 can interfere with each other to prevent the floating member 45 from coming out from the inflow port 41*a* of the drop conveyance passage 41. In other words, even if a service person tries to remove the floating member 45 in the drop conveyance passage 41 from the inflow port 41*a* of the drop conveyance passage 41, the inflow port 41*a* and the floating member 45 interfere with each other and the floating member 45 cannot be removed. Note that the inflow port 41*a* of the drop conveyance passage 41 functions as an opening connected to the suction port of the cleaning device 90 during suction and cleaning by the cleaning device 90 described above.

Figure 5:
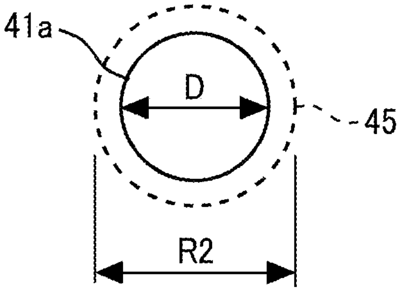
FIG. 5 is a cross-sectional view of an inflow port of a drop conveyance passage and a swinging member viewed from a direction A in FIG. 3.
Figure 6:
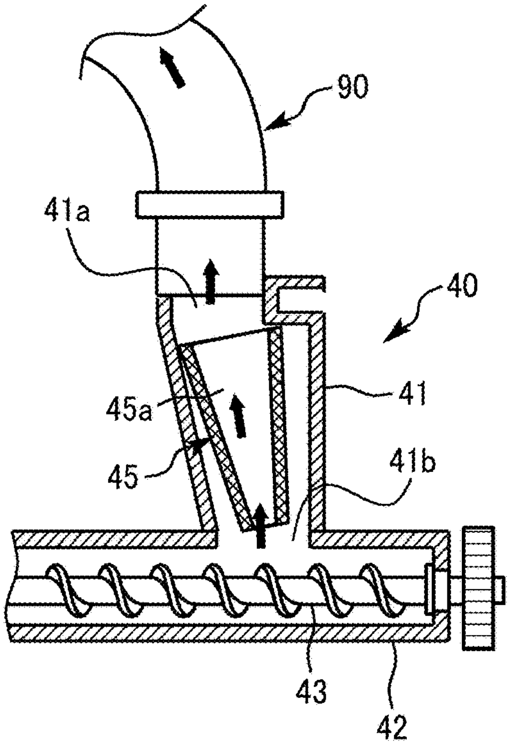
FIG. 6 is a cross-sectional view of a part of the waste-toner conveying device in which a cleaning device is disposed.
Figure 7:
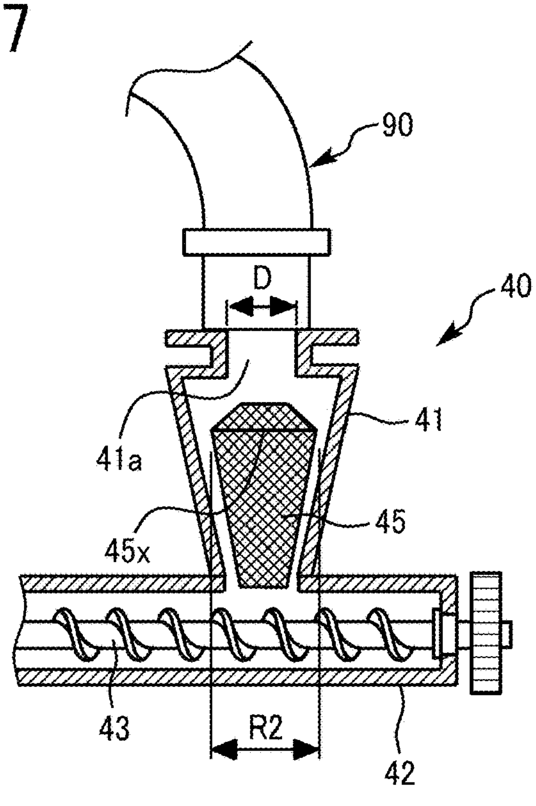
FIG. 7 is a cross-sectional view of a part of a waste-toner conveying device in which a cleaning device is disposed, according to a first modification.

Specifically, as illustrated in FIG. 5, the opening area of the inflow port 41*a* (the area of a portion surrounded by a solid line in FIG. 5) is smaller than the projected area of the floating member 45 when viewed from the inflow port 41*a* (the projected area as viewed from the direction A in FIG. 3 and the area of a portion surrounded by a broken line in FIG. 5). Specifically, in the present embodiment, a hole diameter D of the inflow port 41*a* is smaller than an outer diameter R2 of a large-diameter portion 45*x* (see FIG. 4) of the floating member 45 (D<R2). More specifically, as described above with reference to FIG. 3, the waste-toner conveying device 40 according to the present embodiment is formed such that the vertical relationship of the floating member 45 does not change in the drop conveyance passage 41. As illustrated in FIG. 6, the floating member 45 has a columnar shape, and the large-diameter portion 45*x* that can interfere with the inflow port 41*a* is formed at least in a part of the floating member 45. Thus, as illustrated in FIG. 7, even if a service person tries to remove the floating member 45 in the drop conveyance passage 41 from the inflow port 41*a* of the drop conveyance passage 41, at least the large-diameter portion 45*x* is caught by the inflow port 41*a*, and the floating member 45 cannot be removed. Note that, as described above, the floating member 45 is not oriented horizontally in the drop conveyance passage 41. Thus, the lateral face (the portion of the height H) of the floating member 45 does not interfere with the inflow port 41*a* (does not function as an interfering portion). Accordingly, it is useful to provide the large-diameter portion 45*x* having a large cross-sectional diameter R2 in a part of the column-shaped floating member 45. In a case where the hole shape of the inflow port 41*a* is a rectangle rather than a circle, the hole diameter D thereof corresponds to a length of a diagonal line of a corner portion.

Thus, in the present embodiment, since the inflow port 41*a* and the floating member 45 are formed to be able to interfere with each other, a failure that the floating member 45 comes out from the inflow port 41*a* of the drop conveyance passage 41 is not likely to occur. Specifically, as illustrated in FIG. 6, even when the cleaning device 90 suctions and cleans the waste toner in the drop conveyance passage 41 (waste-toner conveying device 40) in the direction indicated by a black arrow indicated in FIG. 6 from the inflow port 41*a* during maintenance of the waste-toner conveying device 40, a failure that the floating member 45 comes out from the inflow port 41*a* by suction is not likely to occur. Accordingly, a failure that the floating member 45 is sucked into the cleaning device 90 and is lost or broken is less likely to occur.

In the floating member 45 according to the present embodiment, as described above, the large-diameter portion 45*x* is formed to be larger than the inflow port 41*a*. The large-diameter portion 45*x* is also formed to be larger than the outflow port 41*b*. Accordingly, the floating member 45 cannot be set in the drop conveyance passage 41 as it is during the manufacturing process. On the other hand, the floating member 45 is made of an elastic material such as a rubber material so that the floating member 45 can be set in the drop conveyance passage 41 in a state where the floating member 45 is elastically deformed during the manufacturing process. The drop conveyance passage 41 itself may be formed to be dividable (e.g., to be dividable into two semi-conical members) so that the floating member 45 can also be set before the divided drop conveyance passages 41 are assembled during the manufacturing process. In a case where the large-diameter portion 45*x* is formed to be smaller than the outflow port 41*b*, the drop conveyance passage 41 and the intersecting conveyance passage 42 may be formed to be separable. In such a case, the floating member 45 is set from the outflow port 41*b* into the drop conveyance passage 41 in a state of being separated with respect to the intersecting conveyance passage 42 during the manufacturing process. Thereafter, the intersecting conveyance passage 42 is connected to the drop conveyance passage 41 such that the floating member 45 is also set in the drop conveyance passage 41.

As described above with reference to FIG. 4, in the present embodiment, the floating member 45 has the through-hole 45*a* inside along a direction in which the drop conveyance passage 41 extends (which is the vertical direction). As described above, the floating member 45 is provided with the through-hole 45*a* so that the weight of the floating member 45 is reduced, abrasion of the conveying screw 43 and the inner surface of the drop conveyance passage 41 due to contact of the floating member 45 is reduced, and the floating member 45 greatly moved is likely to prevent toner from adhering to the inner surface of the drop conveyance passage 41. Furthermore, a part of waste toner that falls by its weight in the drop conveyance passage 41 falls by its weight via the through-hole 45*a*, so that the fluidity (transportability) of the waste toner in the drop conveyance passage 41 is enhanced. In the present embodiment, since the floating member 45 has the through-hole 45*a*, air containing waste toner flows in the through-hole 45*a* when cleaning is performed using the cleaning device 90 (see FIG. 6). Thus, cleanability is enhanced.

In particular, as illustrated in FIGS. 4 and 6, the through-hole 45*a* of the floating member 45 is formed such that the cross-sectional area (hole diameter) of the through-hole 45*a* gradually increases from the lower end to the upper end. As a result, when cleaning is performed with the cleaning device 90 (see FIG. 6), the floating member 45 (through-hole 45*a*) functions as a tapered nozzle of a cleaner. Thus, waste toner is efficiently suctioned from the lower end (cleanability is further improved).

As illustrated in FIG. 3, in the present embodiment, each of the drop conveyance passage 41 and the floating member 45 is formed such that the cross-sectional area gradually increases from the lower end to the upper end. Specifically, both the floating member 45 and the inside of the drop conveyance passage 41 are formed in a substantially conical shape such that a clearance of the floating member 45 relative to the inner wall of the drop conveyance passage 41 is substantially uniform from a lower end to an upper end. With such a configuration, the floating member 45 moves in the drop conveyance passage 41 while contacting in a well-balanced manner. Thus, a failure that the waste toner adheres to the inner wall of the drop conveyance passage 41 is efficiently reduced.

First Modification

As illustrated in FIG. 7, in a waste-toner conveying device 40 (powder conveying device) according to a first modification, a large-diameter portion 45*x* of the floating member 45 is not formed at the upper end as in the floating member 45 illustrated in FIG. 4, but is formed at a position that is not the upper end (in the example of FIG. 7, a position adjacent to and lower than the upper end). Even in a case where the floating member 45 is formed as described above, an upper portion of the floating member 45 protrudes upward from the inflow port 41*a* due to suction during cleaning by the cleaning device 90. However, the large-diameter portion 45*x* is caught by the inflow port 41*a*, so that the floating member 45 does not come out of the inflow port 41*a*. Note that the positions and the number of the large-diameter portions 45*x* formed on the floating member 45 are not limited to those in FIGS. 4 and 7. Also in the floating member 45 in the first modification, similarly to those illustrated in FIGS. 4 and 6, a through-hole 45*a* may be formed in the floating member 45 along the direction (which is the vertical direction) in which the drop conveyance passage 41 extends.

Second Modification

Figure 8:
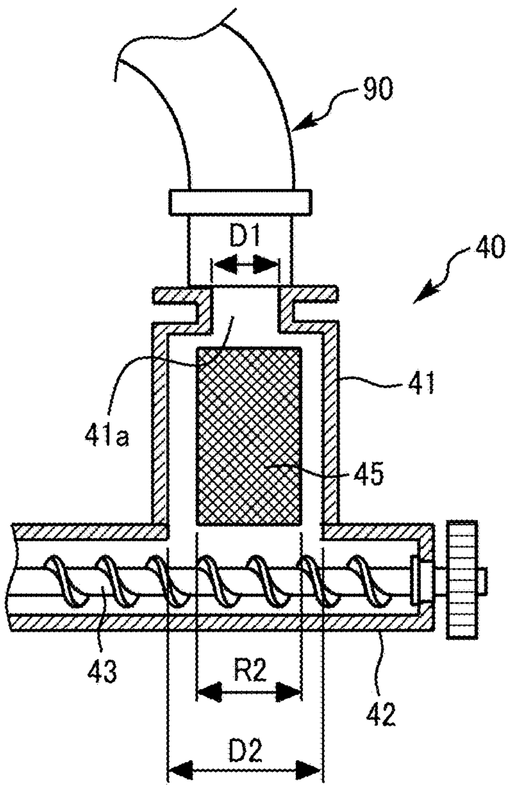
FIG. 8 is a cross-sectional view of a part of a waste-toner conveying device in which a cleaning device is disposed, according to a second modification.

As illustrated in FIG. 8, in a waste-toner conveying device 40 (powder conveyance apparatus) according to a second modification, a drop conveyance passage 41 is formed such that an opening area of an inflow port 41*a* (an opening area of a portion having a hole diameter D1) is smaller than a cross-sectional area, which is orthogonal to a direction in which the drop conveyance passage 41 extends, of a portion excluding the inflow port 41*a* (a cross-sectional area of an inner-diameter portion having an inner diameter D2). In the second modification, a column-shaped (hollow-column-shaped) floating member 45 whose outer diameter is R2 is used in accordance with the cross-section (inner diameter R2) of the drop conveyance passage 41. The outer diameter R2 of the floating member 45 is set to be larger than the hole diameter D1 of the inflow port 41*a* (R2>D1). Even in the case of such a configuration, the occurrence of a failure that the floating member 45 comes out of the inflow port 41*a* of the drop conveyance passage 41 can be reduced. Note that a through-hole 45*a* may also be formed in the floating member 45 in the second modification along the direction in which the drop conveyance passage 41 extends (which is the vertical direction) in the same manner as the floating member 45 illustrated in FIGS. 4 and 6.

Third Modification

Figure 9:
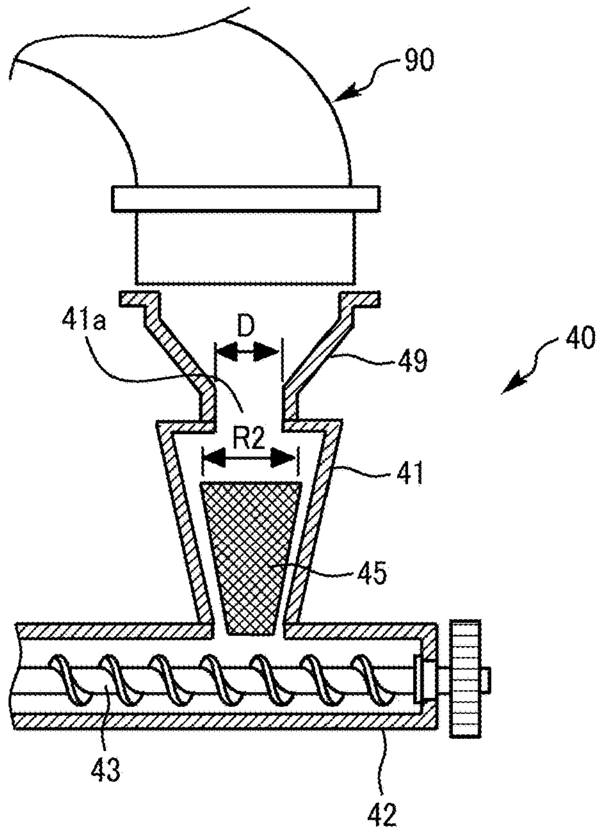
FIG. 9 is a cross-sectional view of a part of a waste-toner conveying device in which a cleaning device is disposed, according to a third modification.

As illustrated in FIG. 9, a waste-toner conveying device 40 (a powder conveying device) according to a third modification includes an upstream drop conveyance passage 49 along which waste toner (powder) drops by its weight toward the inflow port 41*a* of the drop conveyance passage 41. Specifically, the upstream drop conveyance passage 49 communicating with the inflow port 41*a* having a hole diameter D smaller than the outer diameter R2 of the large-diameter portion 45*x* of the floating member 45 is disposed in the waste-toner conveying device 40. In other words, when the upstream drop conveyance passage 49 and the drop conveyance passage are defined as one integrated drop conveyance passage, the inflow port 41*a* that restricts removal of the floating member 45 is provided in a central portion of the integrated drop conveyance passage. Even in the case of such a configuration, the occurrence of a failure that the floating member 45 comes out of the inflow port 41*a* of the drop conveyance passage 41 can be reduced. In the third modification, since the upstream drop conveyance passage 49 is formed in a funnel shape, the upstream drop conveyance passage 49 functions as a tapered nozzle of a cleaner during cleaning by the cleaning device 90. Thus, waste toner can be efficiently suctioned (cleanability is enhanced). Note that a through-hole 45*a* may also be formed in the floating member 45 in the third modification along the direction in which the drop conveyance passage 41 extends (which is the vertical direction) in the same manner as the floating member 45 illustrated in FIGS. 4 and 6.

Fourth Modification

Figure 10A:
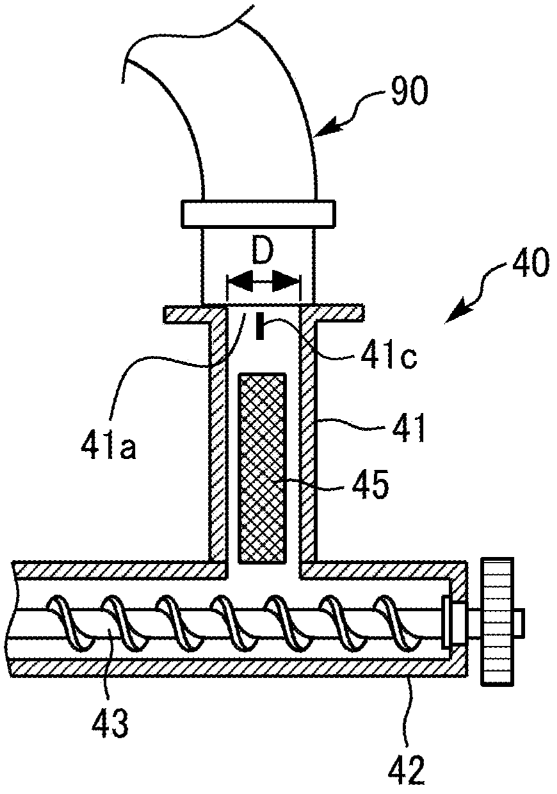
FIG. 10A is a cross-sectional view of a part of a waste-toner conveying device in which a cleaning device is disposed, according to a fourth modification.
Figure 10B:
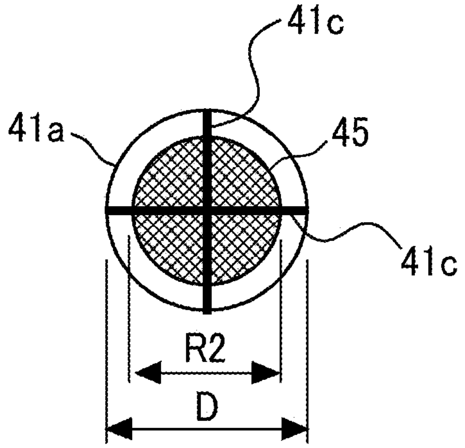
FIG. 10B is a view of a swinging member viewed from a side of an inflow port of a conveyance passage, according to the fourth modification.

As illustrated in FIGS. 10A and 10B, in a waste-toner conveying device 40 (powder conveying device) according to a fourth modification, the inflow port 41*a* of the drop conveyance passage 41 is provided with a restricting member 41*c* as a stopper that restricts the floating member 45 from coming out of the inflow port 41*a*. Specifically, a member in which two rod-shaped members intersect in a cross shape is disposed as the restricting member 41*c* at the inflow port 41*a* (or a position adjacent to the inflow port 41*a*). The restricting member 41*c* is not limited to the configuration illustrated in FIG. 10 and may be any suitable configuration as long as the restricting member 41*c* does not prevent waste toner from flowing into the drop conveyance passage 41 via the inflow port 41*a* from the conveyance tube 16 (see FIG. 3) and prevents the floating member 45 from coming out of the inflow port 41*a*. In the case of such a configuration, the inflow port 41*a* and the floating member 45 are formed to be able to interfere with each other so that the floating member 45 does not come out of the inflow port 41*a* of the drop conveyance passage 41 without setting any particular dimensional relationship between the inflow port 41*a* and a large-diameter portion of the floating member 45. In other words, even if a person tries to remove the floating member 45 in the drop conveyance passage 41 from the inflow port 41*a* of the drop conveyance passage 41, the restricting member 41*c* of the inflow port 41*a* and the floating member 45 interfere with each other. Thus, the floating member 45 cannot be removed. Note that a through-hole 45*a* may also be formed in the floating member 45 in the fourth modification along the direction in which the drop conveyance passage 41 extends (which is the vertical direction) in the same manner as the floating member 45 illustrated in FIGS. 4 and 6.

Fifth Modification

Figure 11:
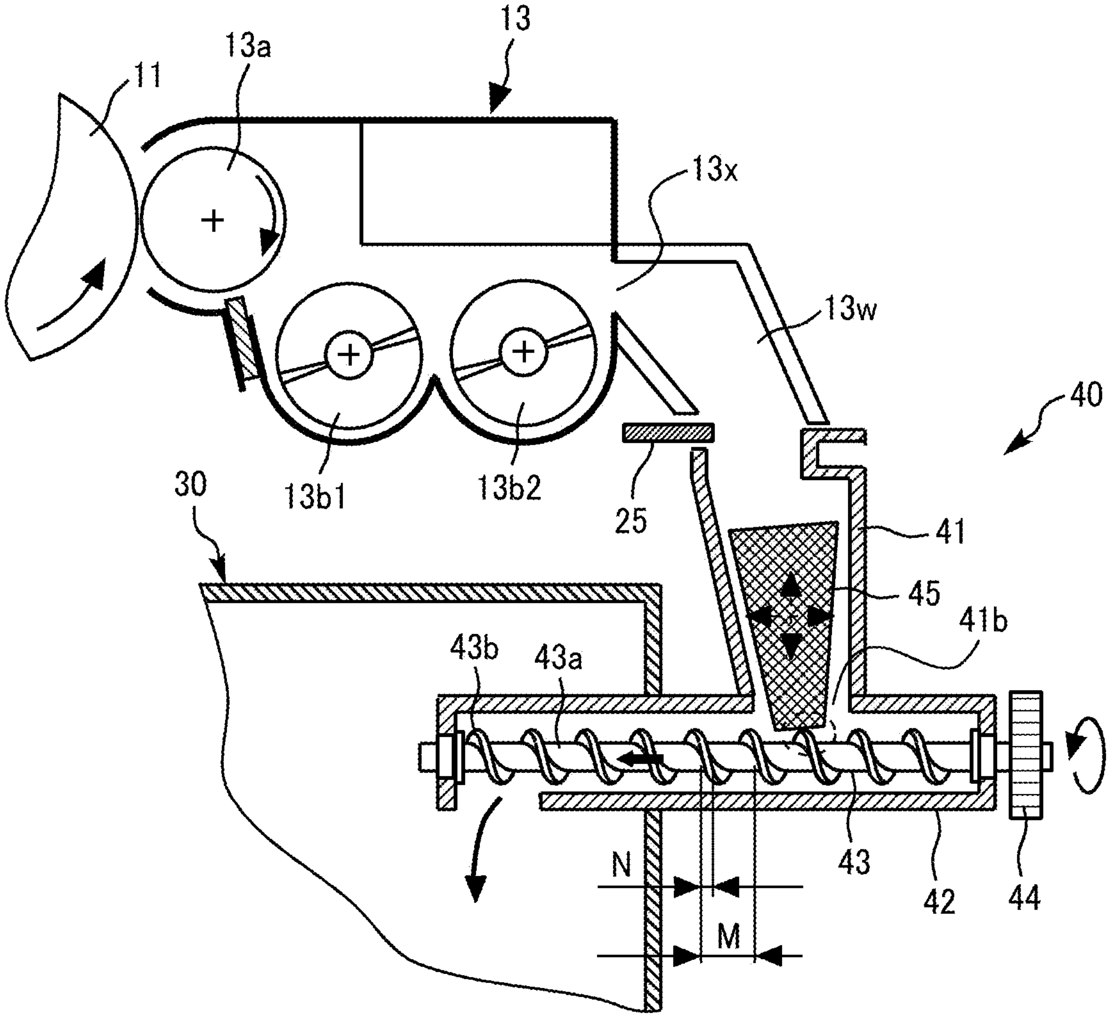
FIG. 11 is a cross-sectional view of a waste-toner conveying device and a developing device according to a fifth modification.

As illustrated in FIG. 11, a powder conveying device (waste-toner conveying device 40) according to a fifth modification is a device that conveys waste developer (powder) ejected from the developing device 13 toward a waste-developer collection container (waste-toner collection container 30). Developer (which is two-component developer composed of toner and carrier) is appropriately supplied from a developer container to the developing device 13 in the fifth modification. When the developer is supplied into the developing device 13, an excess amount of the developer that exceeds the height position of an outflow port 13*x* formed on a developing case is ejected from the outflow port 13*x* and flows into the drop conveyance passage 41 of the powder conveying device (waste-toner conveying device 40) via a relay drop passage 13*w*. The developer that has flowed into the drop conveyance passage 41 is collected in the waste-developer collection container (waste-toner collection container 30) via the intersecting conveyance passage 42. With such a configuration, the developer contained in the developing device 13 can be appropriately refreshed. The powder conveying device (waste-toner conveying device 40) according to the fifth modification is also formed such that the inflow port 41*a* and the floating member 45 can interfere with each other to prevent the floating member 45 from coming out of the inflow port 41*a* of the drop conveyance passage 41. Thus, the occurrence of a failure that the floating member 45 comes out of the inflow port 41*a* of the drop conveyance passage 41 can be reduced. Note that a through-hole 45*a* can also be formed in the floating member 45 according to the fifth modification along the direction in which the drop conveyance passage 41 extends (which is the vertical direction) in the same manner as the floating member 45 illustrated in FIGS. 4 and 6.

As described above, the waste-toner conveying device 40 (powder conveying device) according to the above-described embodiments of the present disclosure includes a drop conveyance passage 41, an intersecting conveyance passage 42, a conveying screw 43, and a floating member 45. Waste toner (powder) that has flowed in from the inflow port 41*a* drops by its weight into the drop conveyance passage 41. The intersecting conveyance passage 42 communicates with a lower end of the drop conveyance passage 41 and extends in an intersecting direction that intersects the drop conveyance passage 41. The conveying screw 43 is disposed in the intersecting conveyance passage 42 and rotates in a specified direction to convey the waste toner in the intersecting direction. The floating member 45 is movably installed in the drop conveyance passage 41 to float in the drop conveyance passage 41. The floating member 45 moves in the drop conveyance passage 41 by contact with the conveying screw 43 that rotates in the specified direction. The inflow port 41*a* and the floating member 45 are formed to be able to interfere with each other to prevent the floating member 45 from coming out of the inflow port 41*a* of the drop conveyance passage 41. With such a configuration, the occurrence of a failure that the floating member 45 comes out of the inflow port 41*a* of the drop conveyance passage 41 can be reduced.

In the above-described embodiments, the present disclosure is applied to the waste-toner conveying device 40 (powder conveying device) in which the untransferred toner collected by the cleaning device 15 or the intermediate transfer belt cleaner 9 is conveyed as waste toner toward the waste-toner collection container 30. However, the present disclosure is not limited to the above-described embodiments, and can readily be applied to, for example, a waste-toner conveying device 40 in which only untransferred toner collected in a cleaning device for a photoconductor drum is conveyed as waste toner toward the waste-toner collection container 30. In the above-described embodiments, the present disclosure is applied to the waste-toner conveying device 40 (powder conveying device) in which waste toner as powder is conveyed. However, the present disclosure is not limited to the above-described embodiments, and can readily be applied to, for example, a powder conveying device in which the untransferred toner (powder) collected by the cleaning device 15 is conveyed as recycle toner toward the developing device 13, a powder conveying device (see FIG. 11) in which waste developer (powder) ejected from a developing device is conveyed toward a waste-developer collection container, or a powder conveying device in which fresh toner (powder) or two-component developer (powder) is conveyed toward a developing device. Such cases also provide substantially the same effects as the effects described above.

Note that embodiments of the present disclosure are not limited to the above-described embodiments and it is apparent that the above-described embodiments can be appropriately modified within the scope of the technical idea of the present disclosure in addition to what is suggested in the above-described embodiments. Further, the number, position, shape, and so forth of components are not limited to those of the present embodiment and variations, and may be the number, position, shape, and so forth that are suitable for implementing the present disclosure.

Note that, in the description of the present application, the term "columnar shape" is defined to include not only a cylindrical shape and a polygonal column shape in which a cross-sectional area is constant in a direction in which the column extends but also a shape in which a cross-sectional area is not constant in the direction in which the column extends, for example, a conical shape, a polygonal pyramid shape, and a drum shape. Furthermore, in the description of the present application, the "large-diameter portion" of the floating member is defined as a portion having the largest cross-sectional area regardless of whether the cross section of the floating member (the cross section orthogonal to the direction in which the floating member extends in a columnar shape) is circular or the cross section of the floating member is polygonal.

Note that aspects of the present disclosure may be, for example, combinations of first to tenth aspects as follows.

First Aspect

In a first aspect, a powder conveying device (e.g., the waste-toner conveying device 40) includes a drop conveyance passage (e.g., the drop conveyance passage 41), an intersecting conveyance passage (e.g., the intersecting conveyance passage 42), a conveying screw (e.g., the conveying screw 43), and a floating member (e.g., the floating member 45). Powder that has flowed into the drop conveyance passage (e.g., the drop conveyance passage 41) from an inflow port (e.g., the inflow port 41*a*) drops by its weight in the drop conveyance passage (e.g., the drop conveyance passage 41). The intersecting conveyance passage (e.g., the intersecting conveyance passage 42) communicates with a lower end of the drop conveyance passage (e.g., the drop conveyance passage 41) and extends in an intersecting direction that intersects the drop conveyance passage (e.g., the drop conveyance passage 41). The conveying screw (e.g., the conveying screw 43) is disposed in the intersecting conveyance passage (e.g., the intersecting conveyance passage 42) and rotates in a specified direction to convey the powder in the intersecting direction. The floating member (e.g., the floating member 45) is movably installed in the drop conveyance passage (e.g., the drop conveyance passage 41) and floats in the drop conveyance passage (e.g., the drop conveyance passage 41) to move by contact with the conveying screw (e.g., the conveying screw 43) that rotates in the specified direction. The inflow port (e.g., the inflow port 41*a*) and the floating member (e.g., the floating member 45) are configured to be able to interfere with each other to prevent the floating member (e.g., the floating member 45) from coming out of the inflow port (e.g., the inflow port 41*a*) of the drop conveyance passage (e.g., the drop conveyance passage 41).

Second Aspect

In a second aspect, in the powder conveying device (e.g., the waste-toner conveying device 40) according to the first aspect, an opening area of the inflow port (e.g., the inflow port 41*a*) is smaller than a projected area of the floating member (e.g., the floating member 45) when viewed from the inflow port (e.g., the inflow port 41*a*).

Third Aspect

In a third aspect, in the powder conveying device (e.g., the waste-toner conveying device 40) according to the first or second aspect, a vertical relationship of the floating member (e.g., the floating member 45) does not change in the drop conveyance passage (e.g., the drop conveyance passage 41). The floating member (e.g., the floating member 45) has a columnar shape and a large-diameter portion (e.g., the large-diameter portion 45*x*) that can interfere with the inflow port (e.g., the inflow port 41*a*) at least in a part of the floating member (e.g., the floating member 45).

Fourth Aspect

In a fourth aspect, in the powder conveying device (e.g., the waste-toner conveying device 40) according to any one of the first to third aspects, the floating member (e.g., the floating member 45) has a through-hole (e.g., the through-hole 45*a*) inside along a direction in which the drop conveyance passage (e.g., the drop conveyance passage 41) extends.

Fifth Aspect

In a fifth aspect, in the powder conveying device (e.g., the waste-toner conveying device 40) according to the fourth aspect, a cross-sectional area of the through-hole (e.g., the through-hole 45*a*) of the floating member (e.g., the floating member 45) is formed to gradually increase from a lower end to an upper end of the floating member (e.g., the floating member 45).

Sixth Aspect

In a sixth aspect, in the powder conveying device (e.g., the waste-toner conveying device 40) according to any one of the first to fifth aspects, each of the drop conveyance passage (e.g., the drop conveyance passage 41) and the floating member (e.g., the floating member 45) is formed such that a cross-sectional area of each of the drop conveyance passage (e.g., the drop conveyance passage 41) and the floating member (e.g., the floating member 45) gradually increases from a lower end to an upper end of each of the drop conveyance passage (e.g., the drop conveyance passage 41) and the floating member (e.g., the floating member 45).

Seventh Aspect

In a seventh aspect, in the powder conveying device (e.g., the waste-toner conveying device 40) according to any one of the first to sixth aspects, the drop conveyance passage (e.g., the drop conveyance passage 41) is formed such that an opening area of the inflow port (e.g., the inflow port 41*a*) is smaller than a cross-sectional area, which is orthogonal to a direction in which the drop conveyance passage (e.g., the drop conveyance passage 41) extends, of a portion excluding the inflow port (e.g., the inflow port 41*a*).

Eighth Aspect

In an eighth aspect, the powder conveying device (e.g., the waste-toner conveying device 40) according to any one of the first to seventh aspects further includes an upstream drop conveyance passage (e.g., the upstream drop conveyance passage 49) along which powder drops by its weight toward the inflow port (e.g., the inflow port 41*a*) of the drop conveyance passage (e.g., the drop conveyance passage 41).

Ninth Aspect

In a ninth aspect, in the powder conveying device (e.g., the waste-toner conveying device 40) according to any one of the first to eighth aspects, the inflow port (e.g., the inflow port 41*a*) of the drop conveyance passage (e.g., the drop conveyance passage 41) is provided with a restricting member (e.g., the restricting member 41*c*) serving as a stopper that restricts the floating member (e.g., the floating member 45) from coming out of the inflow port (e.g., the inflow port 41*a*).

Tenth Aspect

In a tenth aspect, an image forming apparatus (e.g., the image forming apparatus 1) includes the powder conveying device (e.g., the waste-toner conveying device 40) according to any one of the first to ninth aspects.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A powder conveying device, comprising:

a drop conveyance passage in which powder entering from an inflow port thereof is to drop;

an intersecting conveyance passage communicating with a lower end of the drop conveyance passage and extending in an intersecting direction that intersects the drop conveyance passage;

a conveying screw disposed in the intersecting conveyance passage, the conveying screw configured to rotate in a specified direction to convey the powder in the intersecting direction; and a float movably installed in the drop conveyance passage, the float to float in the drop conveyance passage to move by contact with the conveying screw, wherein the inflow port and the float are configured to interfere with each other to prevent the float from coming out of the inflow port of the drop conveyance passage, wherein an opening area of the inflow port is smaller than a projected area of the float when viewed from the inflow port.

2. The powder conveying device according to claim 1, wherein the float has a through-hole inside along a direction in which the drop conveyance passage extends.

3. The powder conveying device according to claim 2, wherein a cross-sectional area of the through-hole gradually increases from a lower end of the float to an upper end of the float.

4. The powder conveying device according to claim 1, wherein a cross-sectional area of the drop conveyance passage gradually increases from the lower end of the drop conveyance passage to an upper end of the drop conveyance passage, and wherein a cross-sectional area of the float gradually increases from a lower end of the float to an upper end of the float.

5. The powder conveying device according to claim 1, wherein the opening area of the inflow port is smaller than a cross-sectional area of a portion of the drop conveyance passage excluding the inflow port, the cross-sectional area being orthogonal to a direction in which the drop conveyance passage extends.

6. The powder conveying device according to claim 1, further comprising an upstream drop conveyance passage upstream from the drop conveyance passage in a direction of flow of the powder, and wherein the powder is to drop toward the inflow port of the drop conveyance passage through the upstream drop conveyance passage.

7. The powder conveying device according to claim 1, wherein the inflow port of the drop conveyance passage is provided with a stopper that restricts the float from coming out of the inflow port.

8. An image forming apparatus, comprising the powder conveying device according to claim 1.

9. A powder conveying device, comprising:

a drop conveyance passage in which powder entering from an inflow port thereof is to drop;

an intersecting conveyance passage communicating with a lower end of the drop conveyance passage and extending in an intersecting direction that intersects the drop conveyance passage;

a conveying screw disposed in the intersecting conveyance passage, the conveying screw configured to rotate in a specified direction to convey the powder in the intersecting direction; and a float movably installed in the drop conveyance passage, the float configured to float in the drop conveyance passage to move by contact with the conveying screw, wherein the inflow port and the float are configured to interfere with each other to prevent the float from coming out of the inflow port of the drop conveyance passage, wherein a cross-sectional area of the drop conveyance passage gradually increases from the lower end of the drop conveyance passage to an upper end of the drop conveyance passage, and wherein a cross-sectional area of the float gradually increases from a lower end of the float to an upper end of the float.

10. The powder conveying device according to claim 9, wherein the float has a through-hole inside along a direction in which the drop conveyance passage extends.

11. The powder conveying device according to claim 10, wherein a cross-sectional area of the through-hole gradually increases from a lower end of the float to an upper end of the float.

12. The powder conveying device according to claim 9, further comprising an upstream drop conveyance passage upstream from the drop conveyance passage in a direction of flow of the powder, and wherein the powder is to drop toward the inflow port of the drop conveyance passage through the upstream drop conveyance passage.

13. The powder conveying device according to claim 1, wherein the inflow port of the drop conveyance passage is provided with a stopper that restricts the float from coming out of the inflow port.

14. An image forming apparatus, comprising the powder conveying device according to claim 1.

15. A powder conveying device, comprising:

a drop conveyance passage in which powder entering from an inflow port thereof is to drop;

an intersecting conveyance passage communicating with a lower end of the drop conveyance passage and extending in an intersecting direction that intersects the drop conveyance passage;

a conveying screw disposed in the intersecting conveyance passage, the conveying screw configured to rotate in a specified direction to convey the powder in the intersecting direction; and a float movably installed in the drop conveyance passage, the float configured to float in the drop conveyance passage to move by contact with the conveying screw, wherein the inflow port and the float are configured to interfere with each other to prevent the float from coming out of the inflow port of the drop conveyance passage, wherein an opening area of the inflow port is smaller than a cross-sectional area of a portion of the drop conveyance passage excluding the inflow port, the cross-sectional area being orthogonal to a direction in which the drop conveyance passage extends.

16. The powder conveying device according to claim 15, wherein the float has a through-hole inside along the direction in which the drop conveyance passage extends.

17. The powder conveying device according to claim 16, wherein a cross-sectional area of the through-hole gradually increases from a lower end of the float to an upper end of the float.

18. The powder conveying device according to claim 15, further comprising an upstream drop conveyance passage upstream from the drop conveyance passage in a direction of flow of the powder, and wherein the powder is to drop toward the inflow port of the drop conveyance passage through the upstream drop conveyance passage.

19. The powder conveying device according to claim 15, wherein the inflow port of the drop conveyance passage is provided with a stopper that restricts the float from coming out of the inflow port.

20. An image forming apparatus, comprising the powder conveying device according to claim 15.

* * * * *